US010338905B1

(12) United States Patent
Hussain et al.

(10) Patent No.: US 10,338,905 B1
(45) Date of Patent: Jul. 2, 2019

(54) COMPUTING INSTANCE SOFTWARE PACKAGE INSTALLATION

(71) Applicant: Amazon Technologies, Inc., Seattle, WA (US)

(72) Inventors: Amjad Hussain, Bellevue, WA (US); Patrick McFalls, Seattle, WA (US); Matthew Adam Ford, Seattle, WA (US); Sivaprasad Venkata Padisetty, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/449,065

(22) Filed: Mar. 3, 2017

(51) Int. Cl.
*G06F 8/61* (2018.01)
*G06F 8/65* (2018.01)
*G06F 9/455* (2018.01)
*G06F 9/445* (2018.01)

(52) U.S. Cl.
CPC .......... *G06F 8/61* (2013.01); *G06F 8/62* (2013.01); *G06F 8/65* (2013.01); *G06F 9/45558* (2013.01); *G06F 2009/4557* (2013.01); *G06F 2009/45562* (2013.01)

(58) Field of Classification Search
CPC ..... G06F 8/61; G06F 8/62; G06F 8/65; G06F 9/45558; G06F 2009/4557; G06F 2009/45562
USPC ......................................... 717/175
See application file for complete search history.

(56) References Cited

U.S. PATENT DOCUMENTS

| | | | | |
|---|---|---|---|---|
| 7,231,410 | B1* | 6/2007 | Walsh | G06F 8/71 707/999.2 |
| 2006/0088013 | A1* | 4/2006 | Ganesh | H04W 4/00 370/338 |
| 2008/0127171 | A1* | 5/2008 | Tarassov | G06F 8/60 717/174 |
| 2009/0070752 | A1* | 3/2009 | Alpern | G06F 8/443 717/148 |
| 2009/0328074 | A1* | 12/2009 | Oshins | G06F 9/45537 719/321 |
| 2010/0042988 | A1* | 2/2010 | Lundin | G06F 9/44505 717/176 |

(Continued)

OTHER PUBLICATIONS

U.S. Appl. No. 15/449,208, filed Mar. 3, 2017, Hussain et al.

*Primary Examiner* — Ryan D. Coyer
(74) *Attorney, Agent, or Firm* — BakerHostetler

(57) ABSTRACT

Software packages may be installed, uninstalled and/or updated across a group of computing instances by way of a single issuance of a user request. The request may include information such as a software package name, a software package version, an action (e.g., install or uninstall), and one or more operating constraints for the software package. For an installation request, an agent on a given computing instance may process the request by accessing a manifest that indicates various computing instance characteristics (e.g., operating system types, architecture types, etc.) and various respective available versions of the software package. The agent may then select, based on characteristics of the computing instance, a package type for the computing instance. An installation request may also allow operating constraints (e.g. regarding usage of processing, memory, I/O and other resources) to be set and enforced for the software package.

20 Claims, 12 Drawing Sheets

(56) References Cited

U.S. PATENT DOCUMENTS

| | | | |
|---|---|---|---|
| 2012/0240181 A1* | 9/2012 | McCorkendale | G06F 21/57 726/1 |
| 2013/0275961 A1* | 10/2013 | Anderson | G06F 9/5072 717/177 |
| 2014/0137114 A1* | 5/2014 | Bolte | G06F 9/45558 718/1 |
| 2015/0227355 A1* | 8/2015 | Tripoli | G06F 8/63 717/175 |
| 2016/0344671 A1 | 11/2016 | Hussain et al. | |

* cited by examiner

```
┌─────────────────────────────────────────────────────────────────────┐
│                         Request Schema 310                          │
├─────────────────────────────────────────────────────────────────────┤
│ {                                                                   │
│   "schemaVersion": "1.2",                                           │
│   "description": "Install or uninstall the latest version or specified version of a package.",
│   "parameters": {                                                   │
│     "name": {                                                       │
│       "description": "The package to install/uninstall.",           │
│       "type": "String"                                              │
│     },                                                              │
│     "version": {                                                    │
│       "description": "A specific version of the package to install. If not specified, the package
│ will be updated to the latest version.",                            │
│       "type": "String",                                             │
│       "default": ""                                                 │
│     },                                                              │
│     "action": {                                                     │
│       "description": "Specify whether or not to install or uninstall the package.",
│       "type": "String",                                             │
│       "default": "Install",                                         │
│       "allowedValues": [                                            │
│          "Install",                                                 │
│          "Uninstall"                                                │
│       ]                                                             │
│     },                                                              │
│     "source": {                                                     │
│       "description": "A URI or other location of the installation package.",
│       "type": "String",                                             │
│       "default": ""                                                 │
│     }                                                               │
│   }                                                                 │
│ }                                                                   │
└─────────────────────────────────────────────────────────────────────┘
```

FIG. 3

COMPUTING INSTANCE SOFTWARE PACKAGE INSTALLATION

BACKGROUND

The use of certain computing resources, such as virtual machine instances, managed computing hardware and/or software instances, and other computing instances, has increased dramatically in recent years. In some examples, a computing service provider may operate large quantities of computing instances that may be executed on behalf of customers of the service provider. For example, the computing instances may be used to host various applications, services, and other resources on behalf of the customers. In some examples, the computing instances operated on behalf of a given customer may have different characteristics, such as different types of operating systems, different processor and other architecture types, and other differing characteristics.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 is diagram illustrating an example configuration request schema that may be used in accordance with the present disclosure.

DETAILED DESCRIPTION

Figure 1:
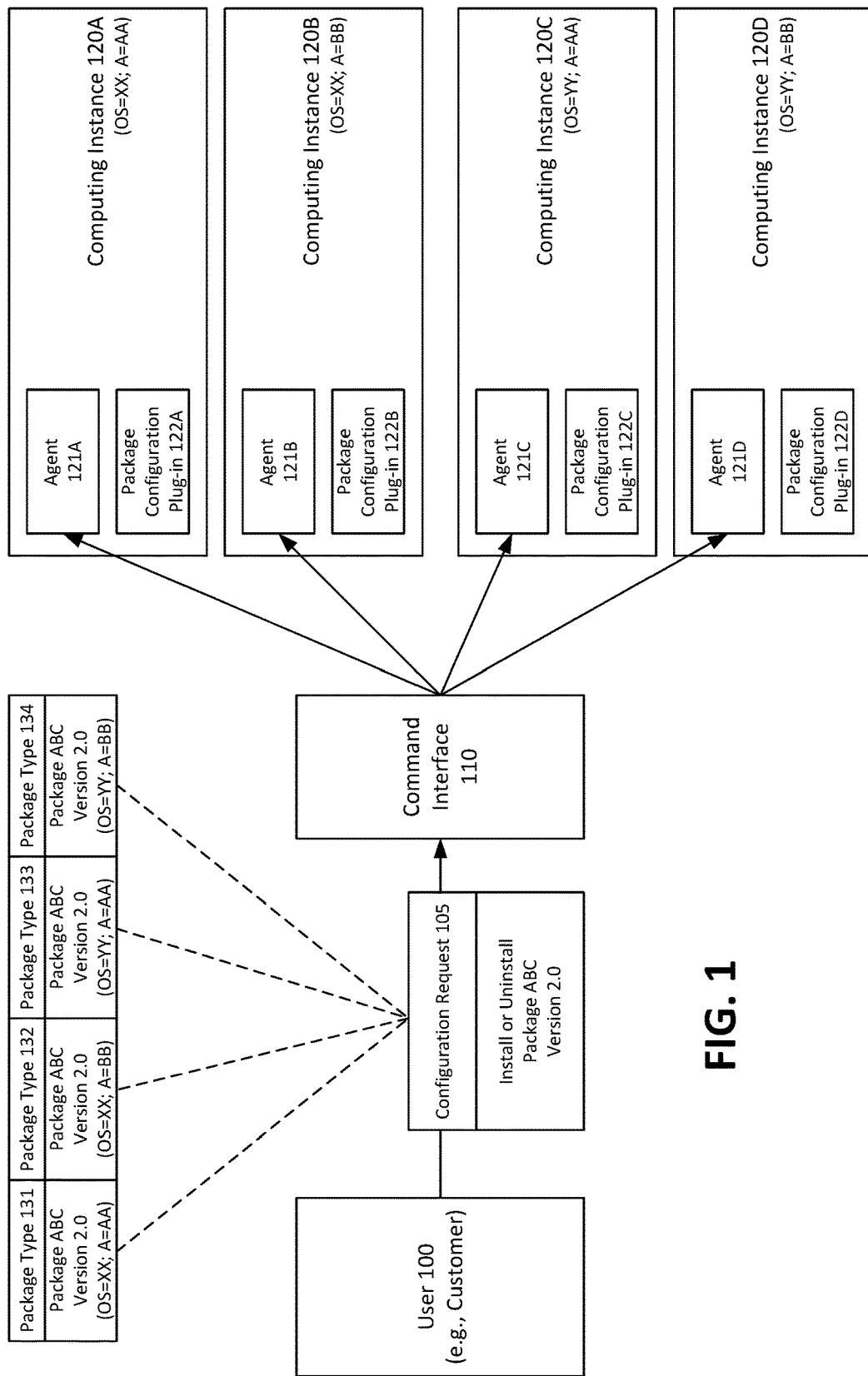
FIG. 1 is a diagram illustrating an example software package installation and monitoring system that may be used in accordance with the present disclosure.

Techniques for software package installation and monitoring are described herein. In some examples, a computing service provider may operate large quantities of computing instances, such as by way of one or more data centers or other large collections of server or other computing resources. The computing instances may include, for example, virtual machine instances and/or managed computing hardware and/or software instances. In some cases, the computing instances may be executed on behalf of customers of the service provider. A particular collection of computing instances that are executed on behalf of a given customer may sometimes be referred to as a fleet. Customer fleets may often be employed to host various applications, services, and other resources on behalf of the customers. In some cases, a customer may wish to have various software packages installed, uninstalled and/or updated across a fleet or other group of the customer's computing instances. These software packages may correspond to software such as various drivers, interfaces, interpreters, applications, programs, and any other types of software installable on a computing instance.

In some examples, installation, uninstallation and/or updating of software packages across a group of a customer's computing instances may present a number of challenges. For example, quantities of computing instances operated on behalf of a given customer may sometimes be quite large, thereby potentially requiring large quantities of installations, uninstallations and/or updates to be performed. Additionally, in some examples, the computing instances operated on behalf of a given customer may have different characteristics, such as different types of operating systems, different processor and other architecture types, and other differing characteristics. These differing characteristics may sometimes require different types of software packages to be installed, such as software packages that may be specific to different types of operating systems, architectures, and other characteristics. Furthermore, in some examples, it may be difficult and burdensome for customers to track when particular versions of a software package are released and/or updated. Moreover, in some cases, different versions may sometimes be released at different times (or not at all) for different operating systems, architectures, or other computing instance characteristics. This may create problems and confusion when a customer attempts to have a given version of a software package installed universally and/or on computing instances for which the version has not yet (or will never be) released. Yet another example challenge is that many customers may not have the access, knowledge and/or expertise to interact with underlying computing instances and may not wish to invest the time and effort required to learn to do so.

For these and other reasons, described herein are various techniques that may allow software packages to be installed, uninstalled and/or updated across a fleet or other group of computing instances by way of a single issuance of a request, such as from a customer or other user. In some examples, the single issuance of the request may allow installation, uninstallation and/or updating of potentially different versions of software package, such as across computing instances that may have different respective characteristics (e.g., operating system types, architecture types, etc.). In some examples, the request may include information such as a name of software package, a version of the software package, an action (e.g., install or uninstall), and a source (e.g., uniform resource identifier (URI)) from which the software package may be obtained. In some examples, one or more components that are operated on the computing instances may receive and process the request, such as one or more agent components and/or agent plug-in components.

In some examples, the request may be a document that complies with a pre-defined exposed format, such as may be associated with the agents, agent plug-ins, and/or other components for processing the request. The request may, for example, be received via a specialized interface that allows various tasks to be executed on the computing instances, and provided, via the interface, to the one or more agent or other components on the customer's computing instances.

For an installation request, an agent on a given computing instance may process the request by accessing a manifest (e.g., at the specified source or other known location) for the software package that indicates various computing instance characteristics (e.g., operating system types, architecture types, etc.) and various respective available versions of the software package. The agent may then select, based on characteristics of the computing instance, a package type for the computing instance, such as a package type corresponding to an appropriate version of the software package that is suitable for installation on an operating system type and architecture type of the computing instance. The agent may then retrieve a information collection associated with the selected package type. The retrieved information collection may include the software package as well as installation instructions and uninstallation instructions. Upon being retrieved from a specified source, the information collection may be stored locally by the agent, for example in a local package folder. The agent may then uninstall any different versions of the software package that were previously installed on the computing instance. The agent may then install the newly retrieved software package on the computing instance by executing the installation instructions included in the retrieved information collection.

For an uninstallation request, the agent may process the request by first stopping execution of any components or processes related to the specified software package on the computing instance. The agent may then locate the stored information collection for the specified software package that may be stored locally to the computing instance during installation as described above. The agent may then execute the uninstallation instructions included in the stored data set to uninstall the specified version. The information collection may then be deleted from local storage upon completion of the uninstallation.

In some examples, upon installation of a particular software package, a customer may wish to set various operating constraints for the software package, such as constraints associated with processor usage, memory usage, input/output (I/O), and other constraints. For example, a customer may wish to limit a particular component to consume no more than a specified amount (e.g., percentage) of processing, memory, I/O and/or other resources. In some examples, an installation request such as described above may also allow these or other operating constraints to be set and enforced for the software package being installed. This may, for example, allow package installation as well as operating constraint setting and enforcement to be accomplished across an entire fleet or other group of computing instances by issuing only single customer request. In some examples, upon installing a software package on a computing instance, an agent may send an indication of any specified operating constraints to a monitoring component, such as an operating system-specific monitoring component, that operates on the computing instance. The monitoring component may then ensure that the installed software package complies with the one or more operating constraints. In some examples, the agent may collect telemetry information associated with the installed software package, such as information related to processor usage, memory usage, input/output (I/O), and other types of information. This information may be reported back to the customer and/or other interested recipients, such as to enable operations of the software packages to be efficiently evaluated and managed.

FIG. 1 is a diagram illustrating an example software package installation and monitoring system that may be used in accordance with the present disclosure. As shown in FIG. 1, a user 100 may have a group of computing instances 120A-D that are operated on the user's behalf. The computing instances 120A-D may include, for example, virtual machine instances and/or managed computing hardware and/or software instances. In some examples, user 100 may be a customer of a cloud or other computing service provider that hosts execution of Computing instances 120A-D on the user's behalf. For example, the computer service provider may operate one or more data centers or other large collections of computing resources. In the example of FIG. 1, computing instances 120A-D have a number of different characteristics with respect to one another, such as different operating system types, different architecture (e.g., processor) types, different package manager types, different framework types, and other different characteristics. In particular, FIG. 1 shows that computing instance 120A has an Operating System XX (as indicated by the text OS=XX within computing instance 120A). Additionally, computing instance 120A has an Architecture AA (as indicated by the text OS=AA within Computing instance 120A). As also shown in FIG. 1, computing instance 120B has Operating System XX and Architecture BB, computing instance 120C has Operating System YY and Architecture AA, and computing instance 120D has Operating System YY and Architecture BB. It is noted that the different operating system and architecture types shown in FIG. 1 are merely non-limiting examples of different computing instance characteristics. Moreover, it is noted that any or all of computing instances 120A-D may, in some examples, represent any number of computing instances having their respective indicated characteristics.

As shown in FIG. 1, user 100 may issue a configuration request 105, such as to install or uninstall a software package on computing instances 120A-D. In the particular example of FIG. 1, configuration request 105 is for installation or uninstallation of Version 2.0 of Software Package ABC. In some examples, Software Package ABC may correspond to software such as various drivers, interfaces, interpreters, applications, programs, and any other types of software installable on computing instances 120A-D. In the example of FIG. 1, Version 2.0 of Software Package ABC has a number of different package types 131-134 that are installable onto computing instances having different characteristics. In particular, package type 131 is designed for characteristics of computing instance 120A (Operating System XX and Architecture AA), package type 132 is designed for characteristics of computing instance 120B (Operating System XX and Architecture BB), package type 133 is designed for characteristics of computing instance 120C (Operating System YY and Architecture AA), and package type 134 is designed for characteristics of computing instance 120D (Operating System YY and Architecture BB). As will be described in detail below, request 105 may, in some examples, allow each of the different package types 131-134 to be installed or uninstalled on an appropriate respective computing instance 120A-D, such as by using only a single request 105 that is issued only once by the user 100.

In the example of FIG. 1, the request 105 is received by command interface 110, which may be an interface that allows customers and other users to issue various tasks, requests, and commands for execution on a fleet or other group of computing instances. Upon receiving the request 105, the command interface 110 may forward the request 105 may forward the request 105 to computing instances 120A-N for processing. In particular, in some examples, the request 105 may be provided to agents 121A-D executing respectively on each computing instance 120A-D. Agents 121A-D may generally be components for executing and managing various tasks and operations on computing instances 120A-D, such as through interaction with various agent plug-in components that may include specialized instructions for performing certain specific tasks and operations. In the example of FIG. 1, the agents 121A-D interact with respective package configuration plug-ins 122A-D, which are agent plug-ins that may include specialized instructions for implementing operations associated with the installation, uninstallation, updating, constraint enforcement, and other configuration-related aspects of software packages.

Figure 2:
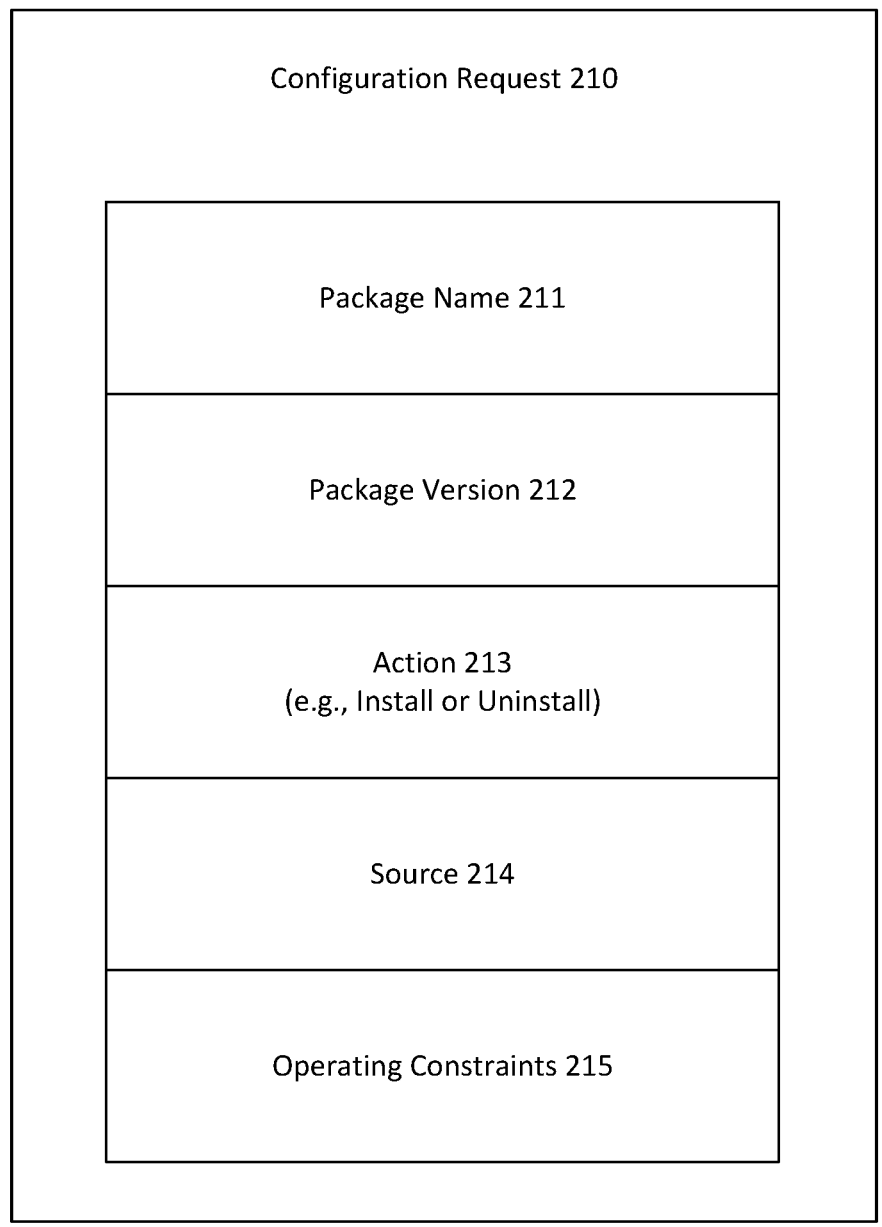
FIG. 2 is diagram illustrating example configuration request parameters that may be used in accordance with the present disclosure.

In some examples, the request 105 may be a document that complies with a pre-defined exposed format, such as may be associated with the agents 121A-D, package configuration plug-ins 122A-D, and/or other components for processing the request 105. Referring now to FIG. 2, some example configuration request parameters will now be described in detail. In particular, as shown in FIG. 2, a configuration request 210 may include parameters such as package name 211, package version 212, action 213, source 214, and operating constraints 215. Specifically, package name 211 may include a name (and/or other identifier) that identifies a software package associated with the request 210. Package version 212 indicates a package version associated with the request 210. As will be described in detail below, in some examples, when there is no package version indicated in the request 210, the request 210 may be associated with a most recently released available package version. Action 213 indicates an action associated with the request 210, such as install or uninstall. Source 214 indicates a location (e.g., uniform resource identifier (URI)) from which the software package may be obtained. In some examples, no source 214 may be indicated in request 210, such as when one or more locations of software packages are otherwise provided to the agents 221A-D. For example, in some cases, locations of software packages may be provided to agents 221A-D in advance of the request 210 by a computing services provider that operates computing instances 120A-D. Operating constraints 215 may indicate various operating constraints that may be assigned, for example by user 100, to a software package that is being installed, such as such as constraints associated with processor usage, memory usage, input/output (I/O), and other constraints. For example, operating constraints 215 may include indications of a threshold amount (e.g., percentage) of usage of processing, memory, I/O and/or other resources, such as resources included in, available to, or otherwise associated with the computing instance on which the software package is being installed. In some examples, operation of the installed software package may be limited, for example such that the software package's usage of those resources may not meet or exceed the thresholds. It is noted that request 210 is merely a non-limiting example configuration request, and that a configuration request may include additional or alternative information or may not include certain information shown in request 210.

Referring now to FIG. 3, an example configuration request schema 310 for a package configuration request will now be described in detail. In the example of FIG. 3, request schema 310 includes a "name" parameter, a "version" parameter, an "action" parameter, and a "source" parameter. The "name" parameter is a string for identifying a package to install or uninstall. The "version" parameter is a string for identifying a specific version of the package to install. In this example, the package is updated to the latest version when no version is specified. The "action" parameter is a string with allowed values of "Install" and "Uninstall." In this example, the default value for the "action" parameter is "Install." The "source" parameter is a string for indicating a URI or other location of the installation package. It is noted that request schema 310 is merely a non-limiting example schema and that other request schemas may be employed with fewer, additional, and/or different parameters. For example, in some cases, the "source" parameter may not be included in a request schema, such as when one or more locations of software packages are otherwise provided to the agents 221A-D as described above. Additionally, a request schema may include additional parameters, such as for indicating operating constraints for an installed software package, such as the processor, memory. I/O, and other constraints as described above.

Figure 4:
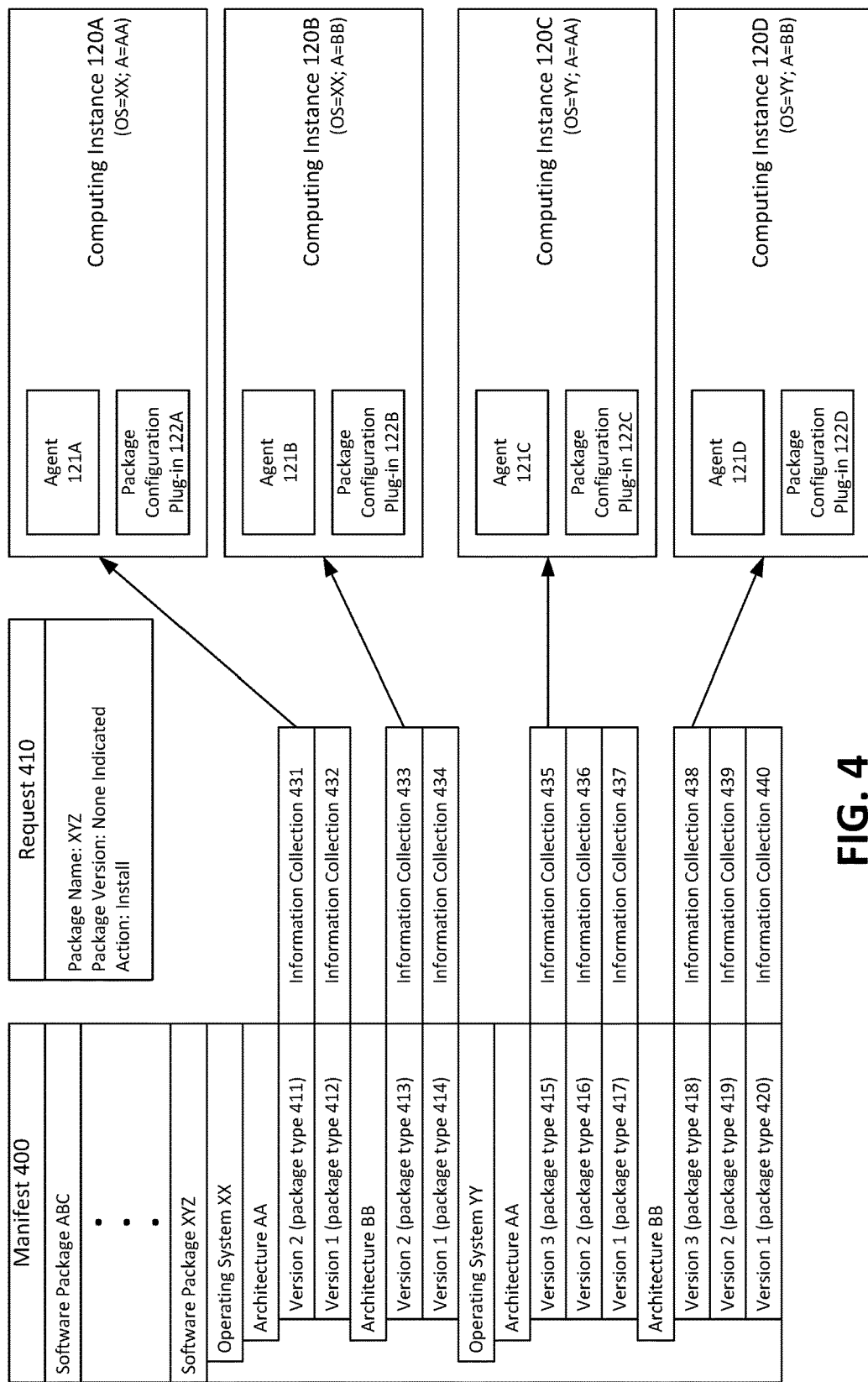
FIG. 4 is a diagram illustrating an example software package manifest that may be used in accordance with the present disclosure.

In some examples, upon receiving a configuration request to install a software package, an agent on a computing instance may process the request by accessing information, such as a manifest, that identifies available package types for the software package. In some examples, a manifest may be stored at a source location from which the software package is obtained, such as a URI or other source location specified in the installation request and/or a source location for the software package that is otherwise provided to the agent. Referring now to FIG. 4, an example software package manifest 400 will now be described in detail. In particular, in the example of FIG. 4, a user has issued a request 410 to install Software Package XYZ. As shown, the request 410 does not indicate a particular version for installation. In this particular example, when no version is indicated in the request 410, agents 121A-D are configured to install a most recently released available version suitable for their respective computing instances 120A-D.

As shown in FIG. 4, upon receiving request 410, agents 121A-D are configured to access manifest 400 in order to select a package type associated with the requested Software Package XYZ for installation on their respective computing instances 120A-D. A package type is a type of a software package that may be installed, such as a particular version that is suitable for installation on a particular type of operating system and/or architecture. In the example of FIG. 4, manifest 400 indicates that there are ten package types 411-420 available for Software Package XYZ. As shown in FIG. 4, manifest 400 is organized in an organizational hierarchy in which package name is at a highest level, operating system is at a second highest level, architecture is at a third highest level, and version is at a fourth highest level. For example, in some cases, agents 121A-D may search through manifest 400 by first searching for the package name (i.e., Software Package XYZ). It is noted that, in addition to Software Package XYZ, manifest 400 may also include information for any number of other software packages, such as Software Package ABC. Upon identifying information for Software Package XYZ, agents 121A-D may next search for an operating system type that matches their respective computing instance 120A-D. For example, agents 121A-B may search for Operating System XX, which corresponds to computing instance 120A. The agents 121A-D may next search for an architecture type that matches their respective computing instance 120A-D. For example, agent 121A may search for Architecture AA, which corresponds to computing instance 120A.

The agents 121A-D may next search for an appropriate version for installation. In this example, since no version is indicated in the request 410, the agents 121A-D may select the most recently released (e.g., typically the highest number) available version suitable for their respective computing instance. For example, manifest 400 indicates that the most recently released available version for Operating System XX and Architecture AA is Version 2. Accordingly, in this example, agent 121A may select package type 411 (corresponding to Version 2 for Operating System XX and Architecture AA) for installation on computing instance 120A. Manifest 400 also indicates that the most recently released available version for Operating System XX and Architecture BB is Version 2. Accordingly, in this example, agent 121B may select package type 413 (corresponding to Version 2 for Operating System XX and Architecture BB) for installation on computing instance 120B. Manifest 400 also indicates that the most recently released available version for Operating System YY and Architecture AA is Version 3. Accordingly, in this example, agent 121C may select package type 415 (corresponding to Version 3 for Operating System YY and Architecture AA) for installation on computing instance 120C. Manifest 400 also indicates that the most recently released available version for Operating System YY and Architecture BB is Version 3. Accordingly, in this example, agent 121D may select package type 418 (corresponding to Version 3 for Operating System YY and Architecture BB) for installation on computing instance 120D.

In some examples, upon selecting a package type, agents 121A-D may then retrieve a information collection associated with the selected package type for installation on their respective computing instance 120A-D. As shown in FIG. 4, information collections 431-440 are associated with package types 411-420, respectively. In particular, agent 121A retrieves information collection 431 associated with selected package type 411, agent 121A retrieves information collection 433 associated with selected package type 413, agent 121C retrieves information collection 435 associated with selected package type 415, and agent 121D retrieves information collection 438 associated with selected package type 418. The contents of these information collections are described in detail below, for example with reference to FIG. 5.

It is noted manifest 400 and the available software packages included therein may, in some examples, be periodically updated, for example in order to add new packages and new versions into the manifest 400 and to add their respective information collections into the source storage locations from which they may be retrieved. In some examples, any combination of one or more different entities may perform this periodic updating. For example, in some cases, a computing service provider that hosts execution of the computing instances 120A-D may monitor for new package or version releases and assist in updating of manifest 400 and the storage of the associated information collections. Additionally, in some examples, software developers may assist in performing this updating when new packages or versions become available. In yet other examples, a third party service may assist in monitoring for new package and version releases and updating manifest 400 and the stored information collections. It is also noted that a manifest is merely one example of information that indicates available software package types and/or locations from which information associated with those package types may be retrieved. However, there is no requirement that such information must be stored in a specific manifest file. There is also no requirement that a manifest file (or the information stored therein) must be organized using the exact hierarchy shown in FIG. 4.

Figure 5:
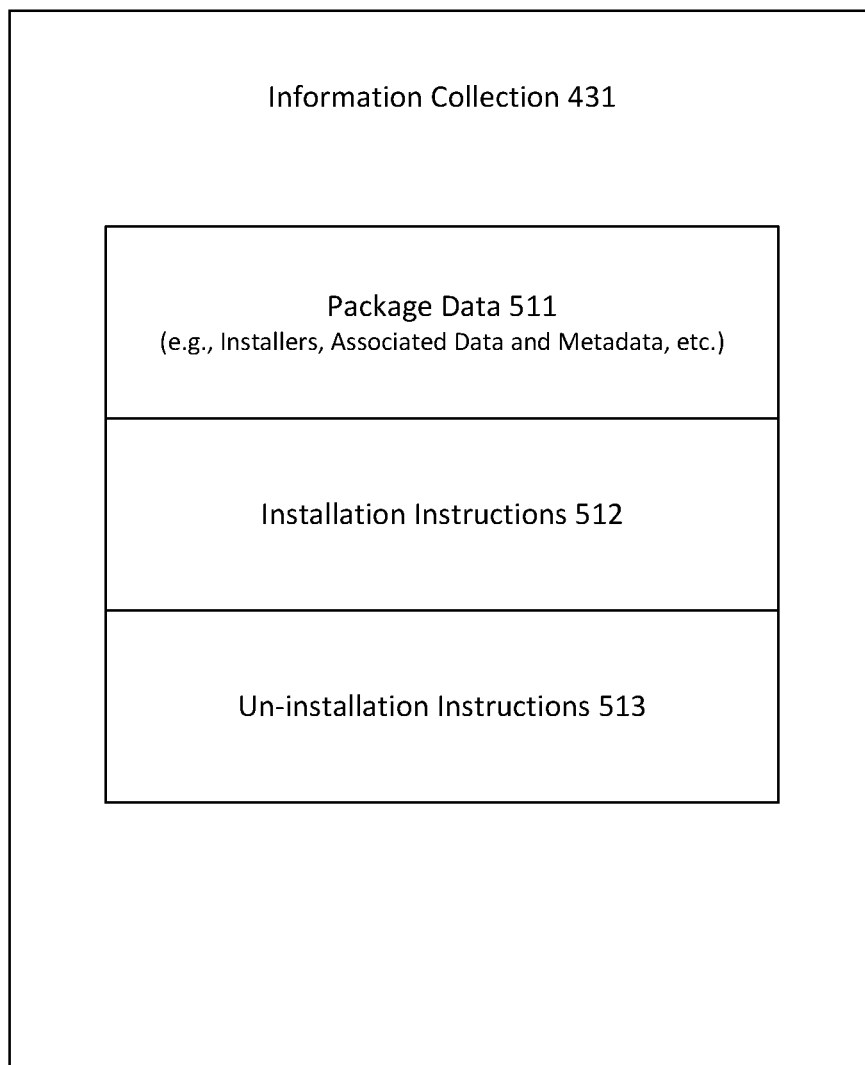
FIG. 5 is a diagram illustrating an example information collection for a package type that may be used in accordance with the present disclosure.

In some examples, information collections 431-440 may each include data that enables installation and uninstallation of their respective package types 411-420 on a computing instance. In some examples, the information collections may include compressed data, such as in a .zip, .tar, or other similar file format. Referring now to FIG. 5, an example information collection 431 now be described in detail. As shown in FIG. 5, information collection 431 includes package data 511, installation instructions 512, and uninstallation instructions 513. Package data 511 may include data included in or otherwise associated with a software package, such as installers (e.g., .msi files, .rpm files, etc.), executable files (e.g., .exe files), and other associated data and/or metadata. Installation instructions 512 may include instructions that are executable by one or more components (e.g., agents 121A-D and/or plug-ins 122A-D) for installing of the software package. For example, in some cases, installation instructions 512 may include instructions to execute one or more scripts to execute a .msi file or other installer within the package data 511. Additionally, in some examples, installation instructions 512 may employ certain specialized .msi or other installer execution capabilities that may be supported by agents 121A-D, plug-ins 122A-D, and/or command interface 110. Installation instructions 512 may also include instructions to reboot a computing instance after installation of the software package. Uninstallation instructions 513 may include instructions that are executable by one or more components (e.g., agents 121A-D and/or plug-ins 122A-D) for uninstalling of the software package. For example, in some cases, uninstallation instructions 513 may include instructions to execute one or more scripts to execute any installers, components, or processes necessary for uninstallation. Uninstallation instructions 513 may also include instructions to reboot a computing instance after uninstallation of the software package. In some examples, installation instructions 512 and uninstallation instructions 513 may each include a document that is formatted for execution by agents 121A-D, plug-ins 122A-D and/or other components that may be employed to install and/or uninstall the software package. It is also noted that, in some examples, information collection 431 may include additional or alternative sets of instructions (not shown in FIG. 5) for performing other actions in addition, or as an alternative to, installing and uninstalling of the software package.

Figure 6:
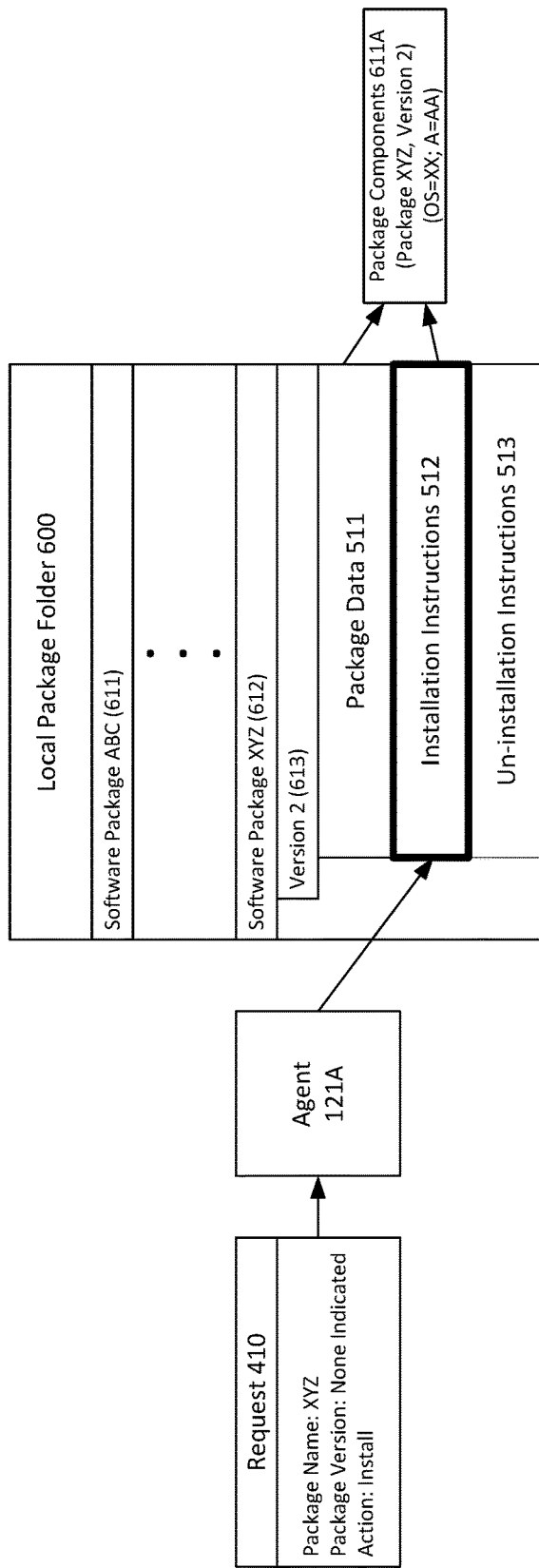
FIG. 6 is a diagram illustrating an example software package installation that may be used in accordance with the present disclosure.

Upon retrieving a information collection for a selected package type, an agent may decompress the information collection and store the information collection at a designated storage location, such as a local package folder on the computing instance. Referring now to FIG. 6, an example is shown in which agent 121A may, upon retrieving a information collection 431, store the contents of the information collection in a local package folder 600 that is locally accessible to the computing instance 120A. In the example of FIG. 6, the agent 121A may store the contents of information collection 431 in a subfolder 613 for "Version 2" that may be created as a child of a parent subfolder 612 for "Software Package XYZ." As shown, agent 121A may decompress, extract, and store package data 511 (or any portions thereof), installation instructions 512, and uninstallation instructions 513 within the "Version 2" subfolder 613. Local package folder 600 may also contain subfolders for other installed software packages, such as subfolder 611 corresponding to "Software Package ABC." In some examples, prior to installing the retrieved software package, the agent 121A may determine whether a different version of the same software package is already installed on the computing instance. For example, in some cases, the agent may examine the local package folder 600 to determine whether a information collection for a different version of Software Package XYZ is already stored within the local package folder 600. If so, the agent 121A may uninstall the different version of Software Package XYZ prior to installing the newly retrieved version of the software package. Some example procedures for uninstalling a software package are described in detail below, for example with reference to FIG. 8.

The agent 121A may then proceed to install the newly retrieved software package on the computing instance. In particular, the agent 121A may install the newly retrieved software package by executing, such as via package configuration plug-in 122A, the installation instructions 512 included within the retrieved information collection 431. As described above, execution of the installation instructions 512 may include execution of various scripts and/or other instructions, such as to run various installers and/or other data within package data 511. The execution of the installation instructions 512, and, in turn, installers and/or other data within package data 511, may result in installation of one or more package components 611A associated with the Version 2 of Software Package XYZ on the computing instance 120A. Additionally, referring now to FIG. 7, it is seen that package components 611A-D are installed on computing instances 120A-D, respectively. It is also seen that the package components 611A-D are suitable for execution on the operating systems and architectures of the computing instances 120A-D on which they are installed. For example, package components 611A correspond to Operating System XX and Architecture AA of computing instance 120A, package components 611B correspond to Operating System XX and Architecture BB of computing instance 120B, package components 611C correspond to Operating System YY and Architecture AA of computing instance 120C, and package components 611D correspond to Operating System YY and Architecture BB of computing instance 120D.

Figure 7:
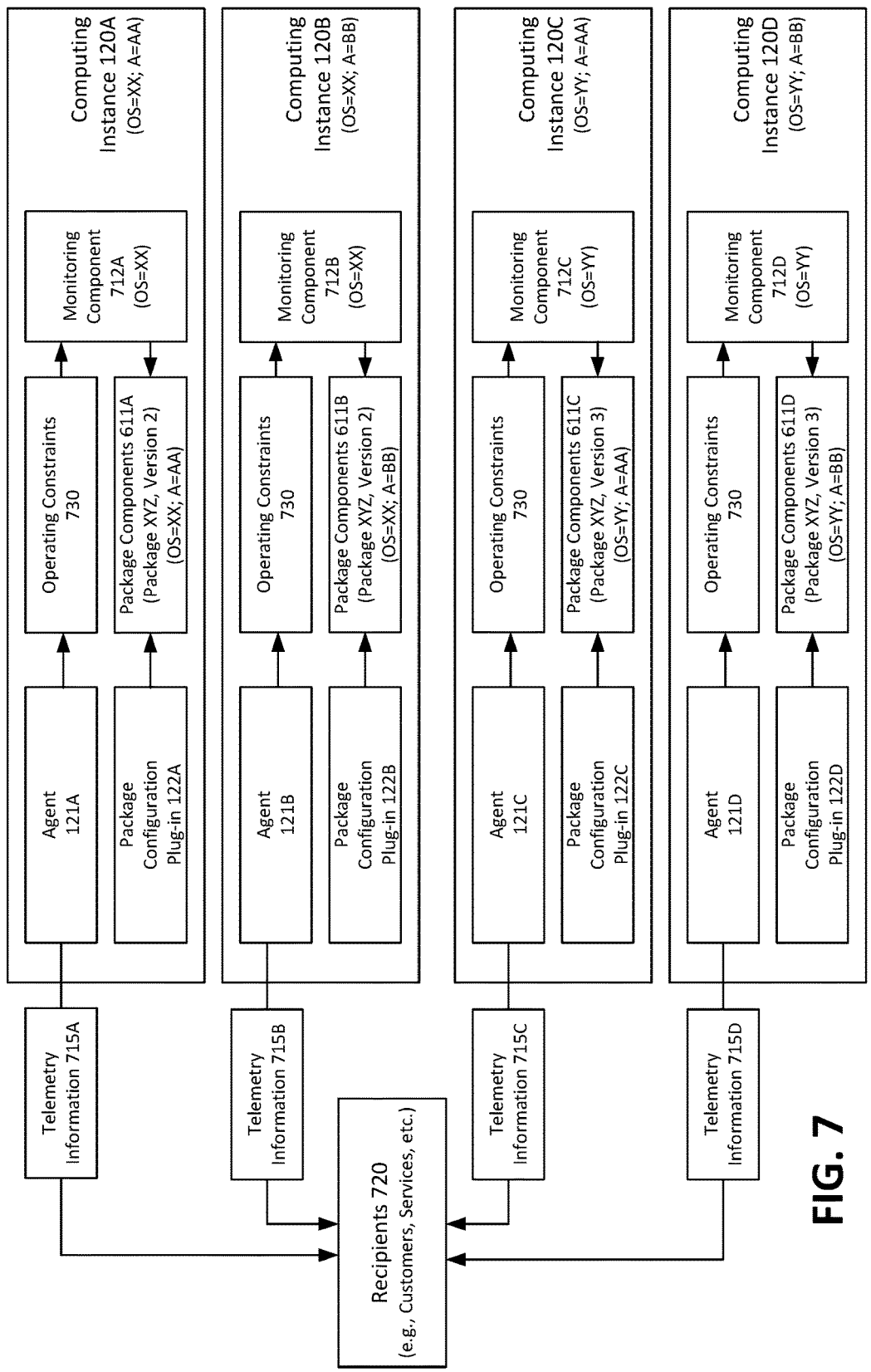
FIG. 7 is a diagram illustrating example software package monitoring that may be used in accordance with the present disclosure.

As also shown in FIG. 7, agents 121A-D may identify various operating constraints 730 (if any) that have been included in the request 410 to install Software Package XYZ. As described in detail above, the operating constraints 730 may include various operating constraints that may be assigned, for example by a customer or other user, to a software package that is being installed, such as such as constraints associated with processor usage, memory usage, input/output (I/O), and other constraints. For example, operating constraints 730 may include indications of a threshold percentage and/or amount of usage of processing, memory, I/O and/or other resources, such as resources included in, available to, or otherwise associated with the computing instance on which the software package is being installed. In some examples, operation of the installed software package may be limited, for example such that the software package's usage of those resources may not meet or exceed the thresholds. In some examples, agents 121A-D may retrieve the operating constraints 730 from request 410 and provide the operating constraints 730 to a respective monitoring component 712A-D, for example in combination with additional information that identifies the installed package components 611A-D to the monitoring component 712A-D and associates the operating constraints 730 with the installed package components 611A-D.

Upon receiving the operating constraints 730 and associated information, monitoring components 712A-D may proceed to monitor the operations of the installed package components 611A-D in order to ensure that the package components 611A-D comply with the operating constraints 730. For example, if package components 611A-D issue a request and/or attempt to perform an operation that may result in meeting or exceeding a threshold amount (e.g., percentage) of usage of processing, memory, I/O, and/or other resources, then monitoring components 712A-D may wholly or partially deny or prohibit the request or operation. In some examples, the denied and/or prohibited request or operation may return an error message and/or may include instructions to re-attempt the request or operation at a later time. Also, in some examples, the denied and/or prohibited request or operation may be logged, for example along with associated metadata (e.g., name of package component issuing request, time of request, type of request, etc.), for further review or evaluation. In some examples, monitoring components 712A-D may be specific to a particular operating system type executed by a computing instance 120A-D. For example, as shown in FIG. 6, monitoring components 712A and 712B are designed for execution on Operating System XX employed by computing instances 120A and 120B, while monitoring components 712C and 712D are designed for execution on Operating System YY employed by computing instances 120C and 120D.

In some examples, agents 121A-D may collect telemetry information associated with various installed software packages and other components executing on computing instances 120A-D. It is seen that telemetry information 715A-D may be collected by agents 121A-D and provided to recipients 720, such as customers, telemetry and reporting services, and other recipients. In some examples, the telemetry information 715A-D may include information related to processor usage, memory usage, input/output (I/O), and other types of information associated with package components 611A-D and computing instances 120A-D. This may also include information regarding operating constraints 730, such as information regarding when, and how frequently, package components 611A-D are approaching and/or attempting to exceed various thresholds specified within the operating constraints 730. In some examples, telemetry information 715A-D may be provided, at least in part, using a notification and subscription model, whereby various recipients 720 may subscribe to receive notifications, for example included in telemetry information 715A-D, regarding various events that are of interest to the recipients 720. For example, recipients 720 may subscribe to receive notifications regarding consumption of various resources by package components 730A-D, for example in relation to thresholds specified in operating constraints 730.

In some examples, it may be desirable for to have agents 121A-D continually check manifest 400 to see when new versions of a software package become available for installation and to install the new versions when available. It is noted that this may be accomplished in a number of ways. For example, in some cases, periodically resubmitting a request to install a software package without an indicated version number may cause agents 121A-D to continually check for newly released versions and to install the latest suitable versions of the software package when they become available. Accordingly, in some examples, a user may manually resubmit an installation request at various intervals in order to check for and install new software package versions. Additionally, in some examples, a service may, upon request, be configured to periodically resubmit an installation request, for example at scheduled intervals and/or in response to various (e.g., a notification that a new version has been released, etc.). This may allow several versions of a software package to be automatically updated and installed on behalf of the user, in some cases using only a single installation request. In yet other examples, the agents themselves may be capable of repeating an installation request, for example at scheduled intervals and/or in response to various events as described above.

Figure 8:
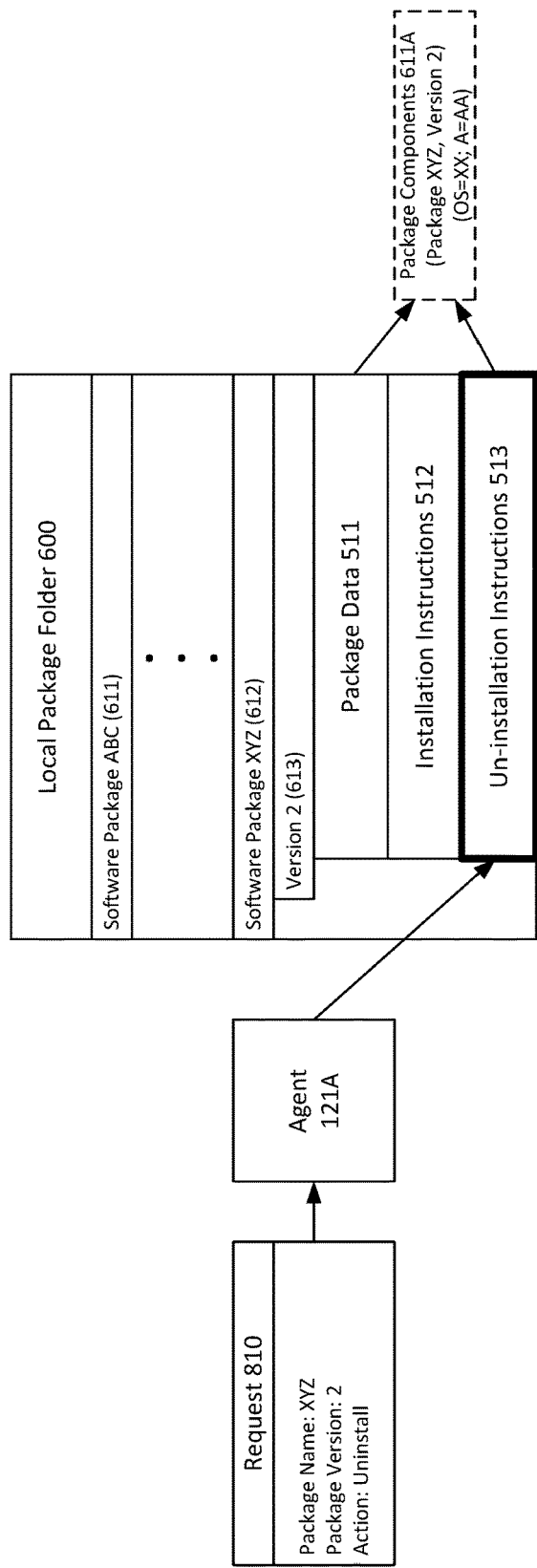
FIG. 8 is a diagram illustrating an example software package uninstallation that may be used in accordance with the present disclosure.

Thus, some examples of installation and monitoring of software packages are described above. As set forth above, a user may also issue a request to uninstall a particular software package from computing instances 120A-D. Referring now to FIG. 8, an example software package uninstallation will now be described in detail. In particular, as shown in FIG. 8, a user may issue an example request 810 to uninstall Version 2 of Software Package XYZ. It is noted that, in some examples, an uninstall request may not indicate a particular version number, which may cause the agent 121A to select a particular version to uninstall (e.g., a most recently released version) if there are multiple installed versions of the software package, or to uninstall the only installed version of the software package if there is only one installed version. In some examples, upon receiving request 810, agent 121A may first stop execution of any components or processes related to the specified software package on the computing instance. The agent 121A may then access local package folder 600 and then locate subfolder 612 associated with Software Package XYZ indicated in the request 810. Agent 121A may then locate, within subfolder 612, the subfolder 613 associated with Version 2 indicated in the request 810.

As described above, during installation of Version 2 of Software Package XYZ, agent 121A may save the contents of the retrieved information collection 431 into the Version 2 subfolder 613. Thus, as shown in FIG. 6, the contents of the retrieved information collection 431 (e.g., including package data 511, installation instructions 512, and uninstallation instructions 513) are saved within the Version 2 subfolder 613. Accordingly, to uninstall Version 2 of Software Package XYZ, agent 121A may execute the uninstallation instructions 513 from Version 2 subfolder 613. It is noted, however, that if, for some reason (e.g., an unintended or accidental deletion), the uninstallation instructions 513 are no longer saved subfolder 613, they may still be retrieved, for example by again obtaining information collection 431 from a designated external storage location via manifest 400 of FIG. 4. As set forth above, uninstallation instructions 513 may include instructions to execute one or more scripts to execute any installers, components, or processes necessary for uninstallation of Version 2 of Software Package XYZ. Uninstallation instructions 513 may also include instructions to reboot computing instance 120A after uninstallation of Version 2 of Software Package XYZ. Accordingly, upon execution of uninstallation instructions 513, package components 611A (corresponding to Version 2 of Software Package XYZ) may be uninstalled from computing instance 120A, as indicated by the dashed lines surrounding package components 611A in FIG. 8. Upon successful uninstallation of Version 2 of Software Package XYZ, the contents of subfolder 613 (e.g., package data 511, installation instructions 512, and uninstallation instructions 513) may be deleted from local package folder 600. It is noted that the above uninstallation techniques are not limited only to instances in which an uninstall request is issued by a user and may also be performed in other circumstances, such as to uninstall a previously installed version of a software package upon installation of a different version requested by a user.

Figure 9:
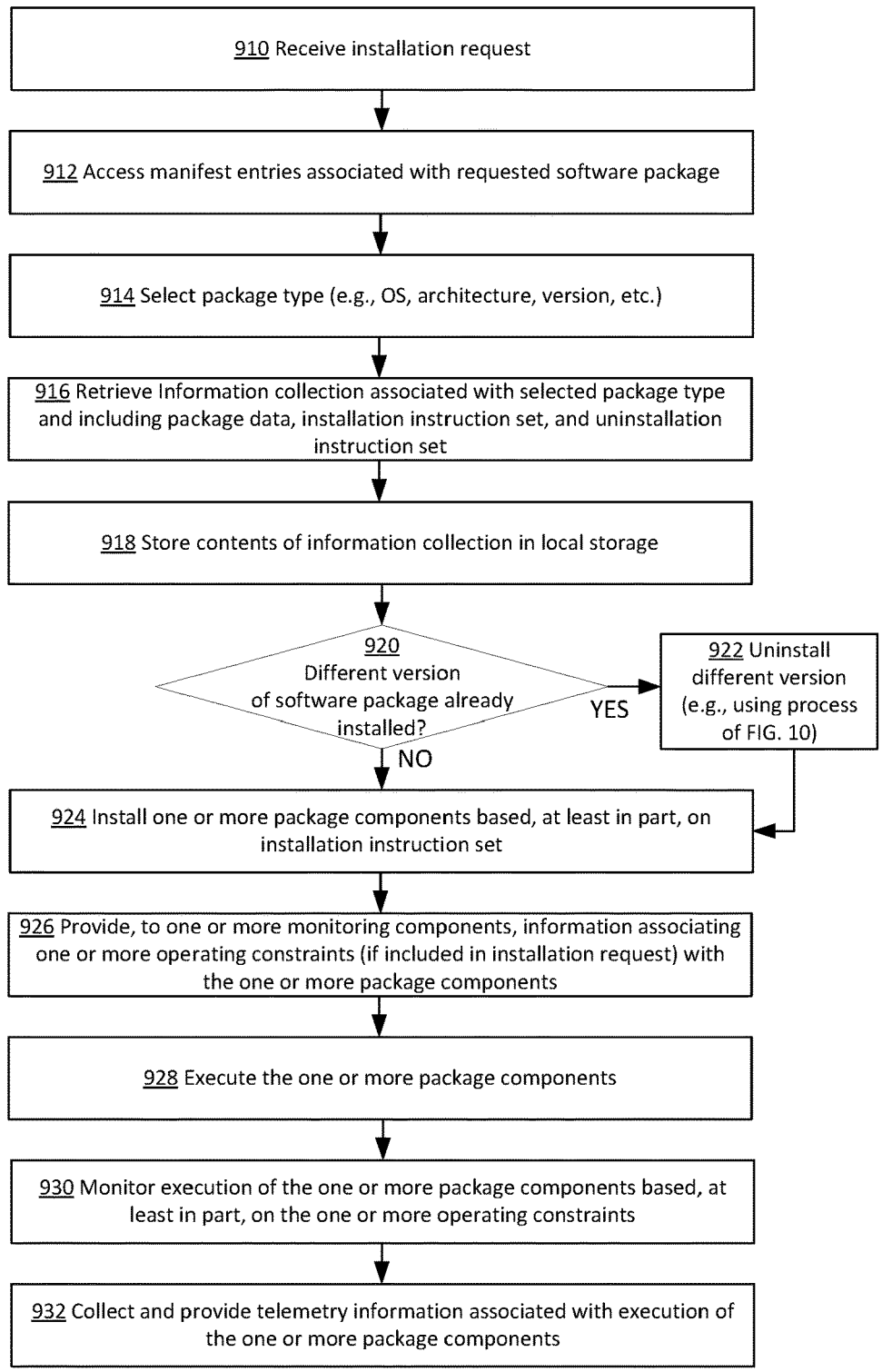
FIG. 9 is a flowchart illustrating an example process for software package installation and execution that may be used in accordance with the present disclosure.

FIG. 9 is a flowchart illustrating an example process for software package installation and execution that may be used in accordance with the present disclosure. As shown, the process is initiated at operation 910, at which an installation request is received for performing installation associated with a software package. In some examples, the installation request may be issued by a user, such as a customer of a computing service provider that operates a group of computing instances on behalf of the user. In some examples, the installation request may indicate the software package and request installation associated with the software package. In particular, in some examples, the installation request may indicate a name of the software package, a version of the software package, an action (e.g., install), a source location from which the software package may be obtained, and one or more operating constraints associated with the software package. In some examples the source location may not be indicated in the request and may instead be provided to the agent, for example by a computing service provider or other party. In some examples, the installation request may be generated using an exposed request format associated with one or more components executing on a computing instance, such as an agent and/or agent plug-in component as described above. In some examples, the request may be issued via an interface such as command interface 110 of FIG. 1, which, in turn, may provide the request to a group of computing instances. As set forth above, in some examples, the installation request may be received by a first computing instance, such as by an agent component executing on the first computing instance. In addition to the first computing instance, the request may also be received by at least a second computing instance for installing associated with the software package on at least the second computing instance. In some examples, the second computing instance may have an operating system type, architecture type, and/or other characteristics that differ from an operating system type, architecture type, and/or other characteristics of the first computing instance. As also set forth above, a single issuance of the installation request, such as by a customer or other user, may enable installation associated with the software package on the first computing instance, the second Computing instance, and any number of additional computing instances, as well as enforcement of any indicated operating constraints in association with the software package on each such computing instance.

At operation 912, manifest entries associated with the software package may be accessed. For example, in some cases, a manifest, such as manifest 400 of FIG. 4, may be maintained at the source location for the software package and may indicate various available package types, such as versions of the software package that are available for different VM characteristics (e.g., operating system type, architecture type, etc.). At operation 914, a package type associated with the software package may be selected for the first computing instance. In some examples, the package type may be selected based, at least in part, on one or more characteristics of the first computing instance, such as an operating system type, an architecture type, and/or other characteristics. The package type may also be selected based, at least in part, on a version of the software package indicated in the installation request. In some examples, when the installation request does not indicate a particular version of the software package, the first package type may selected based, at least in part, on a most recently released available (e.g., as indicated in the manifest and available at the source location) version of the software package. For example, in some cases, the agent may select a package type corresponding to an appropriate version of the software package suitable for the operating system and architecture of the first computing instance.

At operation 916, an information collection associated with the selected package type is retrieved. For example, an agent on the first computing instance may retrieve the information collection from the source location. The information collection may include package data, an installation instruction set, and an uninstallation instruction set. As described in detail above, the package data may include data associated with the selected package type, such as installers and other associated data and/or metadata for the installation. The installation instruction set may include instructions for installing one or more package components associated with the software package and the selected package type, such as scripts and other instructions executable by the agent and/or agent plug-ins. The uninstallation instruction set may include instructions for uninstalling one or more package components associated with the software package and the selected package type, such as scripts and other instructions executable by the agent and/or agent plug-ins. It noted that, in some examples, accessing of the manifest, selecting of the package type, and/or retrieving of the information collection (e.g., operations 912, 914 and/or 916) may be performed, in whole or in part, by one or more services external to the agent and/or computing instance. For example, in some cases, the agent may provide information about one or more computing instance characteristics (e.g., operating system type, architecture type, etc.) to a service, and the service may access a manifest, select a package type, and/or provide a location for the information collection (or retrieve and provide the information collection itself) to the agent.

At operation 918, contents of the information collection may be stored in local storage, for example that is locally accessible to the agent and/or agent plug-in, such as local package folder 600 of FIGS. 6 and 8. In some examples, the local storage may be arranged based on attributes such as package name and version and may include information collections for packages installed on the first computing instance. At operation 920, it may be determined if a different version of the software package is already installed, for example on the first computing instance. For example, in some cases, a different version may be installed when its information collection is stored locally, such as in the local package folder as described above. If there is a different version installed, then it may be uninstalled at operation 922, for example by executing operations of FIG. 10 described below.

At operation 924, one or more package components associated with the software package and the selected package type are installed based at least in part, on the installation instruction set. For example, an agent component, via the package configuration plugin, may install one or more package components associated with the software package and the selected package type, such as package components 611A, on the first computing instance by executing the installation instruction set included in the retrieved information collection, such as described in detail above and not repeated here.

At operation 926, information associating the one or more operating constraints (if included in the installation request) with the one or more installed package components is provided to one or more monitoring components. For example, as set forth above, the operating constraints indicated in the installation request may relate to processor usage, memory usage, I/O usage, and/or usage of other resources. In some examples, the operating constraints may indicate an amount (e.g., percentage) of resource usage that the one or more package components may not meet or exceed. As set forth above, in some examples, the agent may provide the information at operation 926 to one or more monitoring components operating on the first computing instance, such as one more operating system-specific monitoring components. In some examples, the provided information may include an indication of the operating constraints as well as a name, identifier, addresses, memory locations, and/or other information associated with the installed package components. At operation 928, the one or more installed package components may be executed. In some examples, the agent may execute the installed package components, for example as a child process of the agent.

At operation 930, execution of the one or more package components is monitored based, at least in part, on the one or more operating constraints. For example, in some cases, the one or monitoring components may prohibit the one or more package components from violating the one or more operating constraints. In some examples, the one or more package components may be prohibited from meeting or exceeding a threshold amount (e.g., percentage) of processor, memory, I/O, and/or other resource usage indicated in the one or more operating constraints. At operation 932, telemetry information associated with the one or more package components is collected and provided to one or more recipients, such as customers and other users, telemetry and other information services, etc. In some examples, the collected telemetry information may include information indicating behavior of the one or more components in relation to the one or more operating constraints, such as such as information regarding when, and how frequently, the package components are approaching and/or attempting to exceed various thresholds specified within the operating constraints. In some examples, the telemetry information may indicate a time, time range, percentage of time, and other characteristics regarding attempts to meet or exceed various usage thresholds by the one or more package components.

Figure 10:
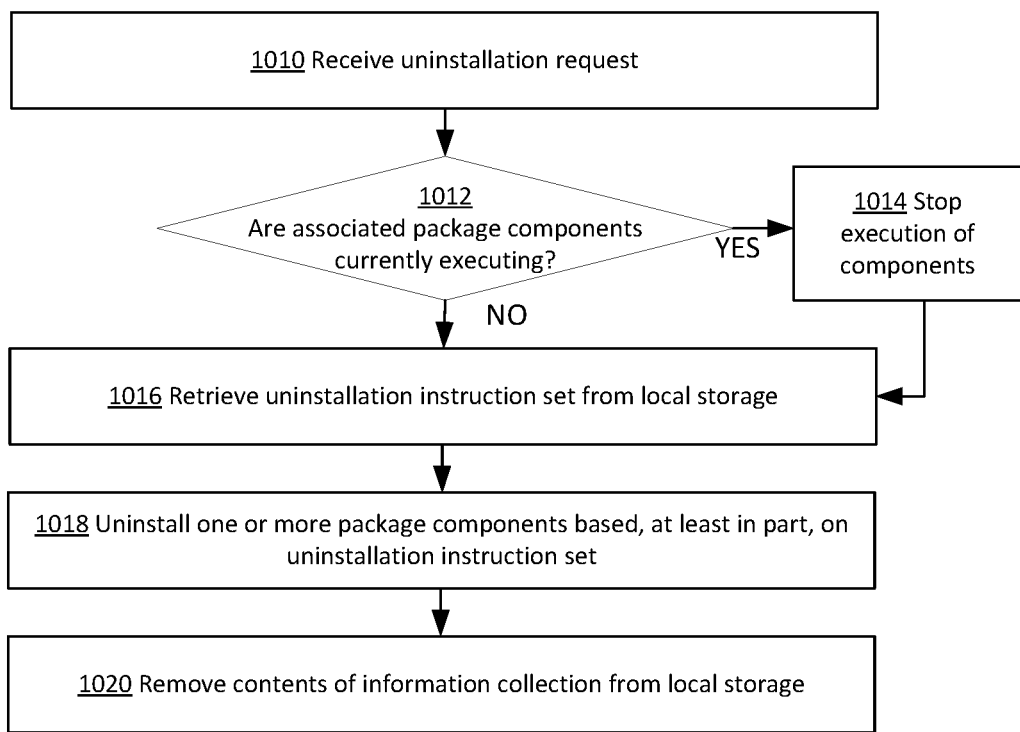
FIG. 10 is a flowchart illustrating an example process for software package uninstallation that may be used in accordance with the present disclosure.

FIG. 10 is a flowchart illustrating an example process for software package uninstallation that may be used in accordance with the present disclosure. As shown, the process is initiated at operation 1010, at which an uninstallation request is received for performing uninstallation associated with a software package. In some examples, the uninstallation request may be issued by a user, such as a customer of a computing service provider that operates a group of computing instances on behalf of the user. In some examples, the uninstallation request may indicate the software package and request uninstallation associated with the software package. In particular, in some examples, the uninstallation request may indicate a name of the software package, a version of the software package, an action (e.g., uninstall), and other information as described above. In some examples, the uninstallation request may be generated using an exposed request format associated with one or more components executing on a computing instance, such as an agent and/or agent plug-in component as described above. In some examples, the request may be issued via an interface such as command interface 110 of FIG. 1, which, in turn, may provide the request to a group of computing instances. As set forth above, in some examples, the uninstallation request may be received by a first computing instance, such as by an agent component executing on the first computing instance. In addition to the first computing instance, the request may also be received by at least a second computing instance for uninstalling associated with the software package from at least the second computing instance. In some examples, the second computing instance may have an operating system type, architecture type, and/or other characteristics that differ from an operating system type, architecture type, and/or other characteristics of the first computing instance. As also set forth above, a single issuance of the uninstallation request, such as by a customer or other user, may enable uninstallation associated with the software package on the first computing instance, the second computing instance, and any number of additional computing instances.

At operation 1012, it is determined whether there are any package components associated with the uninstallation request that are currently executing. If so, execution of those components may be stopped at operation 1014. At operation 1016, an uninstallation instruction set for uninstalling one or more package components associated with the software package and version indicated in the request is retrieved from local storage, such as local package folder 600 of FIGS. 6 and 8. As set forth above, during software package installation, an information collection associated with a selected package type may be retrieved (e.g., at operation 916 of FIG. 9), and an uninstallation instruction set (along with other contents of this information collection) may be stored in local storage (e.g., at operation 918 of FIG. 9), such as in the local package folder within a subfolder that corresponds to the package name and version of the software package.

At operation 1018, the one or more package components associated with the software package and version are uninstalled based at least in part, on the uninstallation instruction set. For example, an agent component, via the package configuration plugin, may uninstall the one or more package components from the first computing instance by executing the uninstallation instruction set included in the retrieved information collection. As set forth above, the uninstallation instruction set may include scripts and other instructions executable by the agent and/or agent plug-ins for uninstalling the one or more package components. At operation 1020, the contents of the information collection are removed from local storage. As set forth above, during installation, the contents of the information collection associated with a selected package type may be stored into local storage, such as a local package folder (e.g., at operation 916 of FIG. 9). As also set forth above, the removed contents may include package data associated with the uninstalled package and version, an installation instruction set, and an uninstallation instruction set. Removal of these contents may, for example, serve to indicate that the package and version has been uninstalled from the first computing instance as well as removing unnecessary data from local storage.

Figure 11:
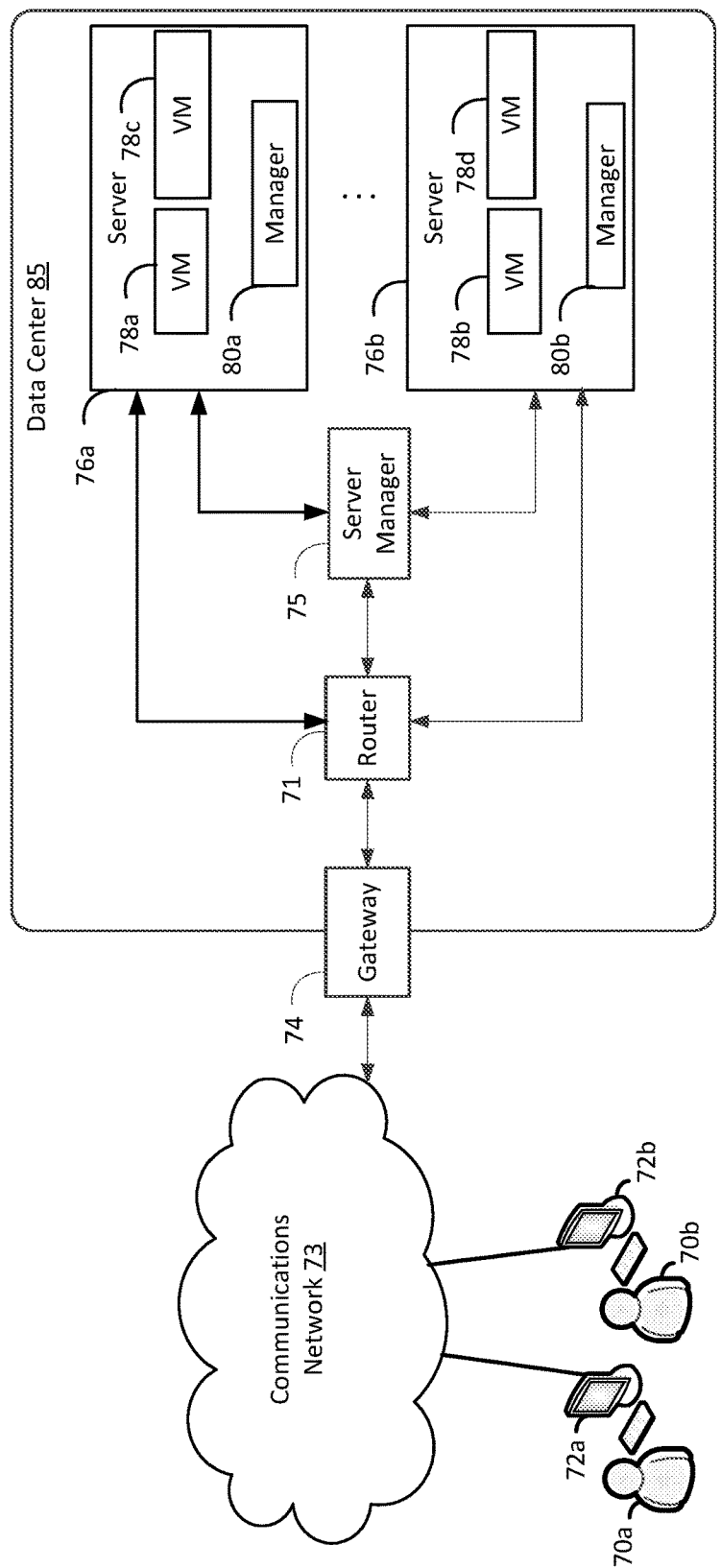
FIG. 11 is a diagram illustrating an example system for transmitting and providing data that may be used in accordance with the present disclosure.

An example system for transmitting and providing data will now be described in detail. In particular, FIG. 11 illustrates an example computing environment in which the embodiments described herein may be implemented. FIG. 11 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as VM instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as VM instances 78a-d (which may be referred herein singularly as VM instance 78 or in the plural as VM instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more VM instances hosted by the physical computing device. A VM instance may be a software emulation of a particular physical computing system that acts as a distinct logical computing system. Such a VM instance provides isolation among multiple operating systems sharing a given physical computing resource. Furthermore, some virtualization technologies may provide virtual resources that span one or more physical resources, such as a single VM instance with multiple virtual processors that span multiple distinct physical computing systems.

Referring to FIG. 11, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 11 may be servers configured appropriately for providing the computing resources described above and may provide computing resources for executing one or more web services and/or applications. In one embodiment, the computing resources may be VM instances 78. In the example of VM instances, each of the servers 76 may be configured to execute an instance manager 80a or 80b (which may be referred herein singularly as instance manager 80 or in the plural as instance managers 80) capable of executing the VM instances 78. The instance managers 80 may be a VM monitor (VMM) or another type of program configured to enable the execution of VM instances 78 on server 76, for example. As discussed above, each of the VM instances 78 may be configured to execute all or a portion of an application.

It should be appreciated that although the embodiments disclosed above discuss the context of VM instances, other types of implementations can be utilized with the concepts and technologies disclosed herein. For example, the embodiments disclosed herein might also be utilized with computing systems that do not utilize VM instances.

In the example data center 85 shown in FIG. 11, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 11, a server manager 75 is also employed to at least in part direct various communications to, from and/or between servers 76a and 76b. While FIG. 11 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 11 has been greatly simplified and that many more networks and networking devices may be utilized to interconnect the various computing systems disclosed herein. These network topologies and devices should be apparent to those skilled in the art.

It should also be appreciated that data center 85 described in FIG. 11 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 12:
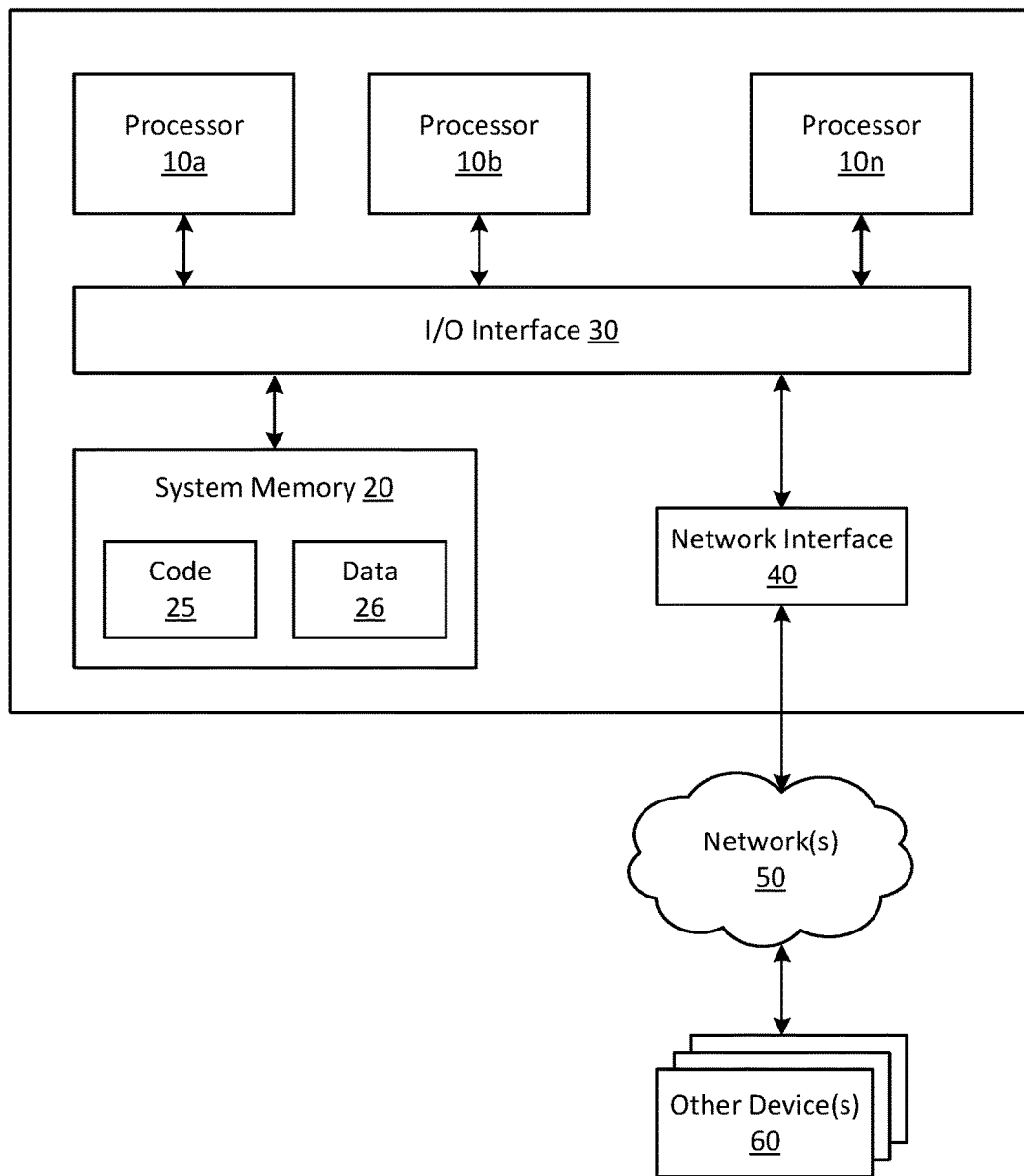
FIG. 12 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 12 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, VMs, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ VMs (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a VM instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for installation associated with a software package comprising:
   one or more processors; and
   one or more memories having stored therein instructions that, upon execution by the one or more processors, cause the computing system perform operations comprising:
      receiving, by one or more first components executing on a first virtual machine instance, a first request indicating the software package and requesting the installation, wherein the first request is also received by at least a second virtual machine instance for installing associated with the software package on at least the second virtual machine instance, wherein the second virtual machine instance has at least one of an operating system type or an architecture type that differs from at least one of an operating system type or an architecture type of the first virtual machine instance;
      selecting, by the one or more first components executing on the first virtual machine instance, based at least in part on at least one of the operating system type or the architecture type of the first virtual machine instance, a package type associated with a first version of the software package for the first virtual machine instance;
      retrieving an information collection comprising data associated with the package type and an instruction set for installing one or more second components associated with the package type;
      uninstalling, by the one or more first components executing on the first virtual machine instance, a second version of the software package from the first virtual machine instance; and
      installing, by the one or more first components executing on the first virtual machine instance, the one or more second components on the first virtual machine instance based, at least in part, on the first instruction set.

2. The computing system of claim 1, wherein the first request further indicates a version of the software package for the installation, and wherein the package type is selected based, in part, on the version of the software package indicated by the first request.

3. The computing system of claim 1, wherein, when the first request does not indicate a particular version of the software package for the installation, the package type is selected based, at least in part, on a most recently released available version of the software package.

4. The computing system of claim 1, wherein the operations further comprise:
   receiving, by the first virtual machine instance, a second request indicating the software package and requesting uninstallation associated with the software package, wherein the second request is also received by at least the second virtual machine instance for uninstalling associated with the software package on at least the second virtual machine instance; and
   uninstalling the one or more second components from the first virtual machine instance.

5. A method for installation associated with a software package comprising:
   receiving, by one or more first components executing on a first computing instance, a first request indicating the software package and requesting the installation, wherein the first request is also received by at least a second computing instance for installing associated with the software package on at least the second computing instance;
   selecting, by the one or more first components executing on the first computing instance, based at least in part on one or more characteristics of the first computing instance, a package type associated with a first version of the software package for the first computing instance;
   retrieving an information collection comprising data associated with the package type and a first instruction set for installing one or more second components associated with the package type;
   uninstalling, by the one or more first components executing on the first computing instance, a second version of the software package from the first computing instance; and
   installing, by the one or more first components executing on the first computing instance, the one or more second components on the first computing instance based, at least in part, on the first instruction set.

6. The method of claim 5, wherein the first request further indicates a version of the software package for the installation, and wherein the package type is selected based, in part, on the version of the software package indicated by the first request.

7. The method of claim 5, wherein, when the first request does not indicate a particular version of the software package for the installation, the package type is selected based, at least in part, on a most recently released available version of the software package.

8. The method of claim 5, wherein the package type is selected based, at least in part, on at least one of an operating system type or an architecture type of the first computing instance.

9. The method of claim 8, wherein the second computing instance has at least one of an operating system type or an architecture type that differs from at least one of an operating system type or an architecture type of the first computing instance.

10. The method of claim 5, wherein a single issuance of the first request enables installations associated with the software package on the first computing instance and on at least the second computing instance.

11. The method of claim 5, wherein the first request is generated using an exposed request format associated with the one or more first components executing on the first computing instance.

12. The method of claim 11, wherein the one or more first components comprise at least one of an agent component or an agent plug-in component.

13. The method of claim 11, further comprising:
receiving, by the first computing instance, a second request indicating the software package and requesting uninstallation associated with the software package, wherein the second request is also received by at least the second computing instance for uninstalling associated with the software package on at least the second computing instance; and
uninstalling the one or more second components from the first computing instance.

14. The method of claim 13, wherein the uninstalling the one or more second components is performed based, at least in part, on a second instruction set for uninstalling the one or more second components, and wherein the information collection further comprises the second instruction set.

15. One or more non-transitory computer-readable storage media having stored thereon instructions that, upon execution by one or more computing devices, cause the one or more computing devices to perform operations comprising:
receiving, by one or more first components executing on a first computing instance, a first request indicating a software package and requesting installation, wherein the first request is also received by at least a second computing instance for installing associated with the software package on at least the second computing instance;
selecting, by the one or more first components executing on the first computing instance, based at least in part on one or more characteristics of the first computing instance, a package type associated with a first version of the software package for the first computing instance;
retrieving an information collection comprising data associated with the package type and a first instruction set for installing one or more second components associated with the package type;
uninstalling, by the one or more first components executing on the first computing instance, a second version of the software package from the first computing instance; and
installing, by the one or more first components executing on the first computing instance, the one or more second components on the first computing instance based, at least in part, on the first instruction set.

16. The one or more non-transitory computer-readable storage media of claim 15, wherein the first request further indicates a version of the software package for the installation, and wherein the package type is selected based, in part, on the version of the software package indicated by the first request.

17. The one or more non-transitory computer-readable storage media of claim 15, wherein, when the first request does not indicate a particular version of the software package for the installation, the package type is selected based, at least in part, on a most recently released available version of the software package.

18. The one or more non-transitory computer-readable storage media of claim 15, wherein the package type is selected based, at least in part, on at least one of an operating system type or an architecture type of the first computing instance.

19. The one or more non-transitory computer-readable storage media of claim 15, wherein the operations further comprise:
receiving, by the first computing instance, a second request indicating the software package and requesting uninstallation associated with the software package, wherein the second request is also received by at least the second computing instance for uninstalling associated with the software package on at least the second computing instance; and
uninstalling the one or more second components from the first computing instance.

20. The one or more non-transitory computer-readable storage media of claim 19, wherein the uninstalling the one or more second components is performed based, at least in part, on a second instruction set for uninstalling the one or more second components, and wherein the information collection further comprises the second instruction set.

* * * * *